United States Patent
Uthe et al.

(10) Patent No.: US 9,527,958 B2
(45) Date of Patent: Dec. 27, 2016

(54) PROCESS FOR PURIFICATION OF POLYETHER CARBONATE POLYOLS

(71) Applicant: Bayer MaterialScience LLC, Pittsburgh, PA (US)

(72) Inventors: Peter Uthe, Carnegie, PA (US); Stephen Bailey, Nitro, WV (US); Robert Gastinger, Avondale, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/268,307

(22) Filed: May 2, 2014

(65) Prior Publication Data
US 2015/0315337 A1    Nov. 5, 2015

(51) Int. Cl.
| | | |
|---|---|---|
| *C08G 65/30* | (2006.01) | |
| *C08G 64/40* | (2006.01) | |
| *C08G 64/02* | (2006.01) | |
| *C08G 64/30* | (2006.01) | |
| *C08G 64/34* | (2006.01) | |

(52) U.S. Cl.
CPC ......... *C08G 64/406* (2013.01); *C08G 64/0208* (2013.01); *C08G 64/302* (2013.01); *C08G 64/34* (2013.01)

(58) Field of Classification Search
USPC ........................................ 568/619, 620, 621
See application file for complete search history.

(56) References Cited

U.S. PATENT DOCUMENTS

| | | | |
|---|---|---|---|
| 4,355,188 A | | 10/1982 | Herold et al. |
| 4,721,818 A | | 1/1988 | Harper et al. |
| 4,877,906 A | | 10/1989 | Harper |
| 4,987,271 A | | 1/1991 | Watabe et al. |
| 5,010,047 A | * | 4/1991 | Schuchardt ................ 502/24 |
| 5,099,075 A | | 3/1992 | Katz et al. |
| 5,144,093 A | | 9/1992 | Reisch et al. |
| 5,235,114 A | | 8/1993 | Reisch et al. |
| 5,248,833 A | | 9/1993 | Hinney et al. |
| 5,416,241 A | * | 5/1995 | Ruszkay ................ 568/621 |
| 6,806,348 B2 | | 10/2004 | Hinz et al. |
| 6,930,210 B2 | | 8/2005 | Malaga Mellado et al. |
| 7,678,944 B2 | | 3/2010 | Jono |
| 8,354,559 B2 | | 1/2013 | Suzuki et al. |

OTHER PUBLICATIONS

Hendricks; Water Treatment Unit Processes (physical and chemical), published in 2006, chapter 14, p. 720.*

* cited by examiner

*Primary Examiner* — Pancham Bakshi
(74) *Attorney, Agent, or Firm* — N. Denise Brown

(57) ABSTRACT

This invention relates to a process for the production of a high purity polyether carbonate polyol. The high purity polyether carbonate polyols prepared by the process herein contain a low level of catalyst residues. The process adds diatomaceous earth to a polyether carbonate polyol to form a suspension, mixes the suspension for a specified time period at a specified temperature, and filters the suspension to form the high purity polyether carbonate polyol.

12 Claims, No Drawings

PROCESS FOR PURIFICATION OF POLYETHER CARBONATE POLYOLS

FIELD

This invention relates to a process for producing a high purity polyol. This invention relates to improving the purity of polyols by reducing the total metal content in the polyols.

BACKGROUND

Various types of polyols having different degrees of purity are commercially available. The market is consistently trending to higher purity products. The purity of polyols is affected by a wide variety of issues, including the residual metal content from the catalyst used to prepare the polyols. The ability to remove the metal content of polyols coming from the catalyst also provides the opportunity to recycle and reuse the catalyst.

Double metal cyanide (DMC) catalysts can be used to prepare, various types of polyols such as, for example, polyether polyols, polyether ester polyols and/or polyether carbonate polyols. Methods are being developed for the removal of DMC catalyst from various types of polyols to stay ahead of the demand.

Many processes have been proposed in the literature to eliminate the catalyst from polyols. The most common method is the treatment of the catalyst containing polyol with an alkali metal, hydride or hydroxide, which generates an iconic form of the catalyst and promotes agglomeration, followed by removal of the catalyst by filtration. Such methods are described in, for example U.S. Pat. No. 5,416,241 (believed to correspond to EP 0 665 254 B1) and U.S. Pat. No. 4,877,906. Another method for removal is treatment of the polyol with an oxidant such as hydrogen peroxide or oxygen containing gas, followed by filtration, as described in U.S. Pat. No. 5,099,075 and U.S. Pat. No. 5,235,114. Other examples include treatment with an acid or polymeric acid that forms chelates with the catalyst, and allows for filtration. (See U.S. Pat. No. 5,248,833, U.S. Pat. No. 6,806,348 and U.S. Pat. No. 7,678,944). Other methods of removing DMC catalysts from polyols are disclosed in U.S. Pat. Nos. 5,144,093; 5,010,047; 4,987,271; 4,721,818 and 4,355,188.

There are inherent issues or problems with the above described treatment methods. These include the need for careful control over the chemical additive to ensure that the product itself is not adversely affected. There is also the added complexity of deactivating and/or removing the added chemical itself from the polyol. In the case of polyols that contain hydrolytic groups such as with polyether carbonates, chemical treatments with compounds such as alkali metals and salts are not appropriate due to chemical attack of the carbonate linkage, which potentially damages the polyol material and leads to uncontrolled broadening of the molecular weight distribution.

Inorganic adsorbents have also been successfully used to remove DMC catalysts from polyols. Both U.S. Pat. No. 6,930,210 and U.S. Pat. No. 8,354,559 (believed to correspond to EP 2058352B1) disclose that polyether polyols can be purified such that they are high purity polyether polyols with low levels of catalytic residue, by the addition of sepiolites. Adsorbents have the advantage of being a less harsh treatment compared to the above chemical treatments, and they can be removed by filtration since they remain insoluble in the polyol.

U.S. Pat. No. 8,354,559 discloses synthetic aluminum silicate, synthetic alumina/magnesia and synthetic hydrotalcite with defined particle sizes that include >90% of the adsorbent to be less than 44 µm, were used to remove the total metal content of the polyol to less than 1 ppm. Adsorbents with larger particle sizes were found to be less effective at catalyst removal.

U.S. Pat. No. 6,930,210 describes the use of sepiolites for catalyst reduction to less than 1 ppm. Sepiolite is a naturally occurring magnesium silicate. Removal of the catalyst was successful using from 0.5 to 1 wt. % solid sepiolite.

Montmorillonite, another inorganic adsorbent, is also effective in removing DMC catalysts from polyols. Montmorillonite is less effective than sepiolite, and the filtration properties were similarly poor. The chemical makeup of montmorillonite is more complex than that of sepiolite as it contains sodium, calcium, aluminum silicate, magnesium silicate, etc. Magnesium silicate is also found in sepiolite.

Purification of polyols prepared from double metal cyanide complex catalysts are disclosed in U.S. Pat. No. 4,877,906. This method for removing the DMC catalyst uses alkali metal compounds and phosphorous compounds to precipitate the residual catalyst, which is then removed by filtration. One embodiment describes treating a propylene oxide polyol with a sodium metal dispersion, capped with ethylene oxide, treated with magnesium silicate, and then filtered through a cake of diatomaceous earth filter aid to remove at least a portion of the catalyst. The catalyst removal is then substantially completed by treating the polyol with hypophosphorous or phosphorous acid to precipitate the remaining solubilized double metal cyanide complex catalyst residue, neutralizing the excess acid with magnesium silicate and filtering the polyol again.

An advantage of this invention is the selection of a specific grade range of diatomaceous earth allows for adsorption of the catalyst while maintaining unique improved flow rates. It is believed that this is due to the porous nature of the biogenic silica in diatomaceous earths as compared to the affective natural clays in sepiolite and other natural adsorbents. Diatomaceous earth also has a higher purity with regard to silica content and greater composition consistency than the clays. The literature reports that sepiolite typically has a silica range of 58 to 75% with the average of 68%. See "Developments in Palygorskite-Sepiolite Research: A New Outlook on these Nanomaterials", by A. Singer and E. Galan; Vol. 3; Elsevier: UK, 2011; p. 38. By comparison, the silica range of diatomaceous earths is typically from 80 to 90%. See "Diatomite: U.S. Geological Survey Mineral Commodity Summaries" 1998, by L. E. Antonides; p. 56-57.

SUMMARY

This invention relates to a process for producing a high purity polyether carbonate polyol which contains a low level of catalyst residues. This process comprises:
(1) adding from 0.5% to 5% by weight, based on 100% by weight of polyether carbonate polyol, of diatomaceous earth having a permeability rating of less than 0.300 darcys (D) to a polyether carbonate polyol to form a suspension;
(2) mixing the suspension formed in (1) for a time period of from about 30 minutes to about 5 hours at a temperature in the range of from about 20° C. to about 150° C.;

and (3) filtering the suspension from (2), thereby forming the high purity polyether carbonate polyol.

DETAILED DESCRIPTION

The present invention will now be described for purposes of illustration and not limitation. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to OH numbers, equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. §112 and 35 U.S.C. §132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise. Permeability is given here in darcys (D). Flow rate is given herein in $kg/m^2 \cdot h$).

As used herein, the term cobalt metal refers to the cobalt complex a part of the total catalyst residue.

The ppm of catalyst residues of the polyether carbonate polyols as disclosed herein were calculated based on the actual measurement of cobalt residues (in ppm) present in the polyether carbonate polyols. Zinc residues (in ppm) present in the polyether carbonate polyols were also measured. The amount of zinc is typically about 18% to 26% of the total catalyst residue, and the amount of cobalt is typically about 8% to 12% of the total catalyst residue.

The high purity polyether carbonate polyols produced by the present process are polyether carbonate polyols which are characterized by low levels of catalyst residues. It is desirable to remove catalyst residues from polyether carbonate polyols to levels consistent with the commercially available polyols.

As used herein, a low level of catalyst residues refers to a polyether carbonate polyol that contains less than or equal to 90 ppm of catalyst residues, or 9 ppm cobalt metal contained in the catalyst residue. In the instant application, the total amount of catalyst residue is inferred or calculated from the cobalt analysis. For DMC catalysts, the cobalt content can be as low as approximately 8%, or approximately 9%. The cobalt content can also be as high as approximately 12%, or approximately 11%. Thus, the cobalt content can range from approximately 8% to approximately 12%, or from approximately 9% to approximately 11%. In addition, the cobalt content in the catalyst residue can be approximately 10% of the total amount of catalyst residue.

The amount of catalyst residues present in the high purity polyether carbonate polyols can be less than or equal to 90 ppm, less than or equal to 60 ppm, less than or equal to 30 ppm, or less than or equal to 15 ppm. The amount of catalyst residues present in the polyether carbonate polyols is typically at least 5 ppm. The amount of catalyst residues present in the polyether carbonate polyol can range from 5 to 90 ppm, from 5 to 60 ppm, from 5 to 30 ppm, and from 5 to 15 ppm.

When measuring cobalt metal present in the polyether carbonate polyol, the amount of cobalt metal present can be less than or equal to 9 ppm, less than or equal to 6 ppm, less than or equal to 3 ppm, or less than or equal to 1.5 ppm. The amount of cobalt metal is typically at least 0.5 ppm. The amount of cobalt metal present can range from 0.5 to 9 ppm, from 0.5 to 6 ppm, from 0.5 to 3 ppm, and from 0.5 to 1.5 ppm.

Suitable polyether carbonate polyols to be purified in accordance with the invention include, for example, polyether carbonate polyols that have functionalities of from 1 to 8, of from 1 to 6, and of from 1 to 3. These preferably polyols are also typically characterized by hydroxyl numbers in the range of from 10 to 300, of from 20 to 270, and of from 25 to 240. In an embodiment of the invention, the polyether carbonate polyols are prepared in the presence of a double metal cyanide (DMC) catalyst. Suitable polyether carbonate polyols are known and described in, for example, U.S. Pat. No. 7,977,501 and U.S. Pat. No. 8,134,022, the disclosures of which are herein incorporated by reference. Suitable polyether carbonate polyols for the present invention can also be prepared as described in, for example, U.S. Published Patent Applications 2013/0296450, 2013/0190462, 2013/0184432, 2013/0123532 and 2013/0072602, the disclosures of which are hereby incorporated by reference. In an embodiment, the polyether carbonate polyols used are prepared in accordance with the process described in U.S. Published Patent Application 2013/0072602, the disclosure of which is hereby incorporated by reference. These polyether carbonate polyols are prepared with a substantially non-crystalline double metal cyanide (DMC) catalyst such as those disclosed in, for example, U.S. Pat. Nos. 5,482,908 and 5,783,513, the disclosures of which are herein incorporated by reference. As recognized by the skilled artisan, these double metal cyanide (DMC) catalysts may comprise a wide variety of metal combinations such as, for example, cobalt and zinc, iron and zinc, etc.

It should also be apparent that the polyether carbonate polyol produced by the present process will have a functionality, hydroxyl number, and equivalent weight/molecular weight that essentially corresponds to that of the starter. The properties of the polyether carbonate polyols are not changed or altered substantially by the presently claimed process.

Suitable diatomaceous earths include, for example, any diatomaceous earth product having a permeability rating of less than 0.300. All permeability ratings are in darcys (D). Diatomaceous earths suitable herein have a permeability rating of less than 0.300, less than or equal to 0.200, or less than or equal to 0.150. The diatomaceous earths also typically have permeability ratings of more than greater than or equal to 0.01, or greater than or equal to 0.02. The diatomaceous earth products herein typically have permeability ratings in the range of from greater than or equal to 0.01 to less than 0.300, in the range of from 0.02 to 0.200, or in some cases in range of from 0.02 to 0.150. The diatomaceous earth products suitable herein include those which are non-calcined, calcined and flux-calcined. Suitable examples of these diatomaceous earths are disclosed in U.S. Pat. No. 6,653,255, the disclosure of which is herein incorporated by reference.

Other examples of suitable diatomaceous earths include for example. Celpure® S25 which is commercially available from Advanced Minerals and has a permeability rating of about 0.025 darcys; Celpure® C65 which is commercially available from Advanced Minerals and has a permeability rating of about 0.065 darcy; Celite® 507 which is commercially available from Imerys and has a permeability rating of about 0.02; Celite® 505 which is commercially available from Imerys and has a permeability rating of 0.06 darcys; Celite® 577 which is commercially available from Imerys and has a permeability rating of about 0.16 darcys; etc. A list of various diatomaceous earths, their particle size distribution and typical physical properties is set forth below. This information in TABLE A and TABLE B below was taken from "Advanced Minerals-Celpure High Purity Diatomate Filter" from http://www.advancedminerals.com/celpure.htm., and from the Technical Bulletin "Celite® Brand Diatomite Filter Aids for Maximum Clarity at Lowest Cost" from World Minerals; © 1999, Celite Corporation.

TABLE A

Examples of Diatomaceous Earths

| Manufacturer | TradeName | Permeability (darcy) |
|---|---|---|
| Advanced Minerals | Celpure ® S25 | 0.025 |
| Advanced Minerals | Celpure ® S65 | 0.065 |
| Imerys | Celite ® 507 | 0.02 |
| Imerys | Celite ® 505 | 0.06 |
| Imerys | Celite ® 577 | 0.16 |

TABLE B

Typical Physical Properties of Various Diatomaceous Earths

| Grade | Color | Product Type | Permeability (darcy) | Median Pore Size (microns) | 150 Mesh % Retained |
|---|---|---|---|---|---|
| Celite ® 507 | Pink/buff | Calcined | 0.02 | 0.5 | N/A |
| Celite ® 505 | Pink/buff | Calcined | 0.06 | 2.0 | N/A |
| Celite ® 500 | Gray | Natural | 0.05 | 1.5 | 1.0 |
| Filter-Cel ® | Buff | Lightly calcined | 0.07 | 2.5 | 1.0 |
| Celite ® 577 | Pink/buff | Calcined | 0.16 | 2.5 | 1.5 |
| Std. Super-Cel ® | Pink/buff | Calcined | 0.25 | 3.5 | 4.0 |

Diatomaceous earth has a higher purity with regard to silica content and greater composition consistency than the natural clays. According to the literature, diatomaceous earths typically have silica contents in the range of from 80 to 90%. By comparison, sepiolite typically has a silica content in the range of from 58 to 75% with an average of 68%.

The process herein comprises (1) adding diatomaceous earth having a permeability rating of less than 0.300 darcys to a polyether carbonate polyol to form a suspension. The amount of diatomaceous earth is from at least 0.5% by weight, at least 0.75% by weight, or in some cases at least 1.00% by weight, based on 100% by weight of the polyether carbonate polyol. Also, the amount of diatomaceous earth to be added is less than or equal to 5% by weight, less than or equal to 2.0% by weight, or in some cases less than or equal to 1.75% by weight, based on 100% by weight of the polyether carbonate polyol. The diatomaceous earth can be added to the polyether carbonate polyol in an amount in the range of from 0.5% to 5% by weight, of from 0.75% to 2.0% by weight, or of from 1.00 to 1.75% by weight, based on 100% by weight of the polyether carbonate polyol.

Once a suspension has been formed by adding the diatomaceous earth to the polyol, the suspension is mixed for the desired time period at the desired temperature. Mixing of the suspension can be for a time of at least 30 minutes, or at least 60 minutes. The suspension is typically mixed for a time period of less than or equal to 5 hours, less than or equal to 240 minutes (i.e. 4 hours), or in some cases less than or equal to 90 minutes. Thus, mixing of the suspension formed in step (1) is for a time period in the range of from 30 minutes to 5 hours, of from 60 minutes to 240 minutes, or of from 60 minutes to 90 minutes.

In addition, the mixing of the suspension can be at a temperature of at least 20° C., at least 70° C., or at least 75° C. The mixing of the suspension can also occur at a temperature of less than or equal to 150° C., less than or equal to 125° C., or less than or equal to 120° C. The suspension can be mixed at a temperature in the range of from 20° C. to 150° C., of from 70° C. to 125° C., or of from 75° C. to 120° C.

Once the suspension has been adequately mixed, it is filtered. Filtration of the suspension typically involves using a single stage pressure filtration system which can use 50 psi of nitrogen to aid in the filtration time. A wide variety of filter designs can be used, pressure and vacuum to aid filtration rates. The filter itself should be adequate to separate approximately 10 µm particles from the polyether carbonate polyol.

It is evident to the skilled artisan that the process herein can use polyether carbonate polyols that have been previously prepared and stored, polyether carbonate polyols that have been previously prepared and transported from one location to another, polyether carbonate polyols that have been previously prepared, stored and transported or vice versa, or polyether carbonate polyols that have been freshly made without being storing and/or transported from one location to another. Once the polyether carbonate polyols have been purified, they may be immediately used in another process such as, for example, to make a polyurethane foam or a polyurethane elastomer, or the polyether carbonate polyols may be stored and/or transported from one location to another before being used in another process.

As will be appreciated by the foregoing description, the present invention is directed, in certain embodiments, to a process for producing a high purity polyether carbonate polyol which contains a low level of catalyst residue, which comprises (1) adding from 0.5% to 5% by weight, based on 100% by weight of polyether carbonate polyol, of diatomaceous earth having a permeability rating of less than 0.300 darcys to a polyether carbonate polyol to form a suspension; (2) mixing the suspension formed in (1) for a time period of from 30 minutes to 5 hours at temperature in the range of from 20° C. to 150° C.; and (3) filtering the suspension from (2), thereby forming the high purity polyether carbonate polyol.

In certain embodiments, the present invention is directed to the process of the previous paragraph, wherein from 0.75% to 2.0% by weight, based on 100% by weight of polyether carbonate polyol, of diatomaceous earth is added to the polyether carbonate polyol.

In certain embodiments, the present invention is directed to the process of any of the previous two paragraphs, wherein from 1.00 to 1.75% by weight, based on 100% by weight of polyether carbonate polyol, of diatomaceous earth is added to the polyether carbonate polyol.

In certain embodiments, the present invention is directed to the process of any of the previous three paragraphs, wherein the diatomaceous earth has a permeability rating of from 0.01 to 0.200 Darcy.

In certain embodiments, the present invention is directed to the process of any of the previous four paragraphs, wherein the diatomaceous earth has a permeability rating of from 0.02 to 0.150 Darcy.

In certain embodiments, the present invention is directed to the process of any of the previous five paragraphs, wherein the suspension formed in (1) is mixed for a time period of from 60 minutes to 240 minutes.

In certain embodiments, the present invention is directed to the process of any of the previous six paragraphs, wherein the suspension formed in (1) is mixed for a time period of from 60 minutes to 90 minutes.

In certain embodiments, the present invention is directed to the process of any of the previous seven paragraphs, wherein the suspension formed in (1) is mixed at a temperature in the range of from 70 to 125° C.

In certain embodiments, the present invention is directed to the process of any of the previous eight paragraphs, wherein the suspension formed in (1) is mixed at a temperature in the range of from 70 to 120° C.

In certain embodiments, the present invention is directed to the process of any of the previous nine paragraphs, wherein the diatomaceous earth is selected from the group consisting of non-calcined diatomaceous earth, calcined diatomaceous earth, flux calcined diatomaceous earth, acid washed diatomaceous earth and mixtures thereof.

In certain embodiments, the present invention is directed to the process of any of the previous ten paragraphs, wherein the polyether carbonate polyol is prepared with a double metal cyanide catalyst.

In certain embodiments, the present invention is directed to the process of any of the previous eleven paragraphs, wherein the high purity polyether carbonate polyol contains no more than 90 ppm of catalyst residue, based on the total weight of the polyether carbonate polyol.

In certain embodiments, the present invention is directed to the process of any of the previous twelve paragraphs, wherein the high purity polyether carbonate polyol contains no more than 9 ppm of cobalt metal, based on the total weight of the polyether carbonate polyol.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively. Prescriptions

EXAMPLES

The following materials were used in the working examples.

Polyol A: a poly(oxypropylene carbonate) polyol, started with a poly(oxypropylene) polyol having a 238 hydroxyl number and a functionality of 3, formed by the random copolymerization of propylene oxide and carbon dioxide. The final product was characterized by a hydroxyl number of 54, functionality of 3, a viscosity of 2910 cSt, and carbonate concentration of approximately 15.3%. A DMC catalyst at a concentration of 300 ppm was used as the polymerization catalyst. The final product was analyzed for cobalt and zinc. The results were as follows: Cobalt analysis=28 ppm, Zinc analysis=63 ppm.

Polyol B: a poly(oxypropylene) polyol, started with a poly(oxypropylene) polyol having a 238 hydroxyl number and a functionality of 3, formed by the polymerization of propylene oxide. The final product was characterized by a 20 hydroxyl number, a functionality of 3, and a viscosity of 2455 cSt, A DMC catalyst at a concentration of 200 ppm was used as the alkoxylation catalyst. The final product was analyzed for cobalt and zinc. The results were as follows: Cobalt analysis=16.5 ppm, Zinc analysis=35.7 ppm.

Polyol C: a poly(oxypropylene) polyol, started with a poly(oxypropylene) polyol having a 238 hydroxyl number and functionality of 3, formed by the polymerization of propylene oxide. The final product was characterized by a 56 hydroxyl number, a functionality of 3, and a viscosity of 534 cSt. A DMC catalyst at a concentration of 90 ppm was used as the alkoxylation catalyst. The final product was analyzed for cobalt and zinc. The results were as follows: Cobalt analysis=9.5 ppm, Zinc analysis=22.7 ppm.

Polyol D: a poly(oxypropylene) polyol, started with a poly(oxypropylene) polyol having a 238 hydroxyl number and functionality of 3, formed by the continuous addition of glycerin and propylene glycol during the polymerization of propylene oxide. The final product was characterized by a 237 hydroxyl number, a functionality of 3, and a viscosity of 257 cSt. A DMC catalyst at a concentration of 60 ppm was used as the alkoxylation catalyst. The final product was analyzed for cobalt and zinc. The results were as follows: Cobalt analysis=6.0 ppm, Zinc analysis=13.2 ppm.

Polyol A was Prepared Using the Following Method:

DMC catalyst (prepared in accordance with Example 6 of WO-A 01/80994) and a glycerin based starter (i.e. a poly (oxypropylene) polyol having a 238 hydroxyl number and a functionality of 3) were initially introduced into a reactor. The reactor was heated up to 130° C. and rendered inert by repeated charging with nitrogen to approx. 5 bar and subsequent letting down to approx. 1 bar. This operation was carried out 3 times. An activation charge of propylene oxide was added to the reactor at 130° C. and in the absence of carbon dioxide. The start-up of the reaction manifested itself by a temperature peak and by a drop in pressure to the starting pressure (approx. 1 bar). After the first drop in pressure, a second PO activation was added, and then third PO activation charge, as a result of which in each case a temperature peak and a drop in pressure in turn. After, the reactor was charged with 50 bar of $CO_2$ and a fourth and final PO activation charge was added. After 33 minutes the reactor was regulated such that the pressure was kept constant by regular metering in of $CO_2$ and the remaining propylene oxide was added continuously into the reactor, while the temperature was lowered to 105° C. in 5° C. increments every five minutes. When the addition of PO had ended, stirring was continued for a further 60 minutes at 105° C.

Polyols B and C were Prepared by the Following Method:

A glycerin based starter (a poly(oxypropylene) polyol having a 238 hydroxyl number and functionality of 3) was charged to the reactor along with a double metal cyanide catalyst prepared according to the procedure disclosed in U.S. Pat. No. 5,482,908. This mixture was heated to 130° C. with nitrogen stripping of the polyol/catalyst blend. Propylene oxide was charged to activate the catalyst. After activation, the reactor was maintained at 130° C. and propylene oxide was added over a 4 hour period. After digestion at 130° C. for 0.5 hours, the polyether was stripped to remove any unreacted propylene oxide, cooled, and discharged.

The information in TABLE 1, TABLE 2, TABLE 3A and TABLE 3B was taken from "Advanced Minerals-Celpure High Purity Diatomate Filter" from http://www.advanced-minerals.com/celpure.htm, and from the Technical Bulletin "Celite® Brand Diatomite Filter Aids for Maximum Clarity at Lowest Cost" from World Minerals; 1999, Celite Corporation.

General Process for the Adsorbent Treatment of Polyol A Through D:

To a 500 mL round bottom flask was added 250 g of polyol catalyzed using a double metal cyanide catalyst prepared according to the procedure disclosed in U.S. Pat. No. 5,482,908, the disclosure of which is herein incorporated by reference. This system was kept under a nitrogen atmosphere and agitated during treatment. To this polyol was added 10% by weight cyclic propylene carbonate (CPC) and the desired weight percent adsorbent at temperatures ranging from room temperature up to 100° C. The CPC was used to simulate the presence of the byproduct formed during the copolymerization of propylene oxide and $CO_2$. As illustrated in TABLE 10, the addition of CPC to the polyol had no significant affect in catalyst removal compared to adsorption without the addition of CPC to the polyol. After the set time, one weight percent inert filter aid (Celite® Hyflo Super-Cel Z, except for Celite® 577 which used perlite) was added and the system filtered at the treatment temperature. For these Examples, a simple single stage pressure filter was used with filter paper ranging in filtration size from 5 μm to 20 μm. The type of filter paper used was based on the adsorbent particle size to attain adequate separation from the polyol and yield a clear final product. The filter type was selected to provide adequate separation of the solid adsorbent from the polyol.

Fraction 1 (F1) was taken after the first 10% polyol was filtered and Fraction 2 (F2) was the remaining 90% polyol. The purpose of fraction F1 was to show the adsorption of the metal before filter cake build up and to serve as an indicator for the adsorption strength of the adsorbent versus a filtration removal mechanism. Fraction F2 thereby illustrates the removal based on both an adsorption and filtration removal mechanism. Both fractions were analyzed for cobalt and zinc content by inductively coupled plasma (ICP) elemental analysis.

Tables 4A, 4B, 5A and 5B below show the residual cobalt levels and residual zinc levels, respectively, for Fractions 1 and Fractions 2, when filtering Polyol A with the various Adsorbents shown in Tables 4A, 4B, 5A and 5B.

It was found that the zinc to cobalt ratios in the final product after adsorption were in agreement with those in the initial product. Thus, it is evident that the catalyst was not destroyed or disrupted by the adsorption process. This, of course, enables one to reuse the catalyst in another polymerization step.

TABLE 1

Diatomaceous Earths and Other Adsorbents

| Diatomaceous Earth Examples | Manufacturer | TradeName | Permeability (darcy) |
|---|---|---|---|
| A | Advanced Minerals | Celpure ® S25 | 0.025 |
| B | Advanced Minerals | Celpure ® 565 | 0.065 |
| C (Comparative) | Advanced Minerals | Celpure ® C1000 | 1.00 |
| D | Imerys | Celite ® 507 | 0.02 |
| E | Imerys | Ceiite ® 505 | 0.06 |
| F | Imerys | Celite ® 577 | 0.16 |
| G (Comparative) | Imerys | Celite ® Standard Super-Cel | 0.30 |
| H (Comparative) | Imerys | Celite ® Hyflo Super-Cel Z | 1.10 |
| I (Comparative) | Imerys | Celite ® 535 | 3.00 |
| J (Comparative) | Imerys | Celite ® 545 | 4.00 |
| K (Comparative) | Aldrich | Sepiolite Product #70253 | |

TABLE 2

Typical Particle Size Distribution[1] for Various Diatomaceous Earths Cumulative Weight % Finer Than Micron Size

| Diatomaceous Earth - Grade | 1.0 μm | 1.5 μm | 2.0 μm | 3.0 μm | 4.0 μm | 6.0 μm | 8.0 μm | 12.0 μm | 16.0 μm | 24.0 μm | 32.0 μm | 48.0 μm | 64.0 μm | 96.0 μm | 128.0 μm | 196.0 μm | Median Particle Size, μm |
|---|---|---|---|---|---|---|---|---|---|---|---|---|---|---|---|---|---|
| Celite ® 507 | 2 | 5 | 8 | 16 | 25 | 40 | 55 | 72 | 83 | 92 | 96 | 99 | 100 | 100 | 100 | 100 | 7.3 |
| Celite ® 505 | 1 | 2 | 4 | 8 | 14 | 26 | 36 | 54 | 65 | 80 | 89 | 95 | 98 | 99 | 100 | 100 | 10.9 |
| Celite ® 500 | 0 | 0 | 1 | 3 | 7 | 15 | 25 | 37 | 48 | 63 | 74 | 87 | 94 | 98 | 99 | 100 | 17.3 |

TABLE 2-continued

Typical Particle Size Distribution[1] for Various Diatomaceous Earths Cumulative Weight % Finer Than Micron Size

| Diatomaceous Earth - Grade | 1.0 μm | 1.5 μm | 2.0 μm | 3.0 μm | 4.0 μm | 6.0 μm | 8.0 μm | 12.0 μm | 16.0 μm | 24.0 μm | 32.0 μm | 48.0 μm | 64.0 μm | 96.0 μm | 128.0 μm | 196.0 μm | Median Particle Size, μm |
|---|---|---|---|---|---|---|---|---|---|---|---|---|---|---|---|---|---|
| Filter-Cel ® | 0 | 0 | 0 | 2 | 4 | 11 | 19 | 32 | 43 | 60 | 72 | 86 | 93 | 98 | 99 | 100 | 19.2 |
| Celite ® 577 | 0 | 0 | 0 | 1 | 3 | 10 | 17 | 29 | 40 | 57 | 70 | 85 | 92 | 97 | 99 | 100 | 20.8 |
| Std. Super-Cel ® | 0 | 0 | 0 | 1 | 3 | 9 | 16 | 29 | 39 | 56 | 70 | 84 | 92 | 97 | 99 | 100 | 20.9 |
| Celite ® 512 | 0 | 0 | 0 | 1 | 3 | 8 | 14 | 25 | 34 | 50 | 63 | 78 | 88 | 96 | 99 | 100 | 23.9 |
| Celite ® 513 | 0 | 0 | 0 | 1 | 1 | 5 | 9 | 17 | 26 | 43 | 57 | 75 | 87 | 95 | 98 | 100 | 28.0 |
| Hyflo ® Super-Cel ® | 0 | 0 | 0 | 0 | 1 | 4 | 8 | 15 | 23 | 39 | 55 | 72 | 85 | 95 | 98 | 99 | 30.1 |
| Celite ® 501 | 0 | 0 | 0 | 0 | 1 | 3 | 6 | 13 | 21 | 39 | 53 | 72 | 84 | 94 | 98 | 99 | 30.6 |
| Celite ® 503 | 0 | 0 | 0 | 0 | 1 | 2 | 5 | 11 | 19 | 33 | 48 | 68 | 83 | 94 | 98 | 99 | 33.9 |
| Celite ® 535 | 0 | 0 | 0 | 0 | 0 | 1 | 3 | 7 | 11 | 22 | 38 | 57 | 75 | 91 | 96 | 99 | 42.9 |
| Celite ® 545 | 0 | 0 | 0 | 0 | 0 | 0 | 1 | 3 | 7 | 19 | 34 | 52 | 67 | 84 | 93 | 98 | 46.5 |
| Celite ® 560 | 0 | 0 | 0 | 0 | 0 | 0 | 0 | 1 | 2 | 5 | 10 | 17 | 28 | 50 | 72 | 93 | 95.7 |

[1]As determined by Leeds & Northup X100 Microtrac particle size analyzer

TABLE 3A

Physical Properties of Various Diatomaceous Earths

| Diatomaceous Earth - Grade | Color | Product Type | Permeability (darcy) | Median Pore Size (μm) | Approx. ΔP @ 1 GSFM w/0.15 lb/SF Precoat | Estimated GSFH Water; 6" Precoat 24" Hg |
|---|---|---|---|---|---|---|
| Celite ® 507 | pink/buff | calcined | 0.02 | 0.5 | 8.00 | N/A |
| Celite ® 505 | pink/buff | calcined | 0.06 | 2.0 | 3.0 | N/A |
| Celite ® 500 | gray | natural | 0.05 | 1.5 | 3.20 | N/A |
| Filter-Cel ® | buff | lightly calcined | 0.07 | 2.5 | 2.60 | N/A |
| Celite ® 577 | pink/buff | calcined | 0.16 | 2.5 | 1.20 | N/A |
| Std. Super-Cel ® | pink/buff | calcined | 0.25 | 3.5 | 0.70 | 10 |
| Celite ® 512 | pink/buff | calcined | 0.50 | 5.0 | 0.40 | 20 |
| Celite ® 513 | white | flux calcined | 0.75 | 6.0 | 0.20 | 40 |
| Hyflo ® Super-Cele ® | white | flux calcined | 1.10 | 7.0 | 0.10 | 50 |
| Celite ® 501 | white | flux calcined | 1.30 | 9.0 | 0.07 | 65 |
| Celite ® 503 | white | flux calcined | 1.90 | 10.0 | 0.06 | 130 |
| Celite ® 535 | white | flux calcined | 3.00 | 13.0 | 0.03 | 240 |
| Celite ® 545 | white | flux calcined | 4.00 | 17.0 | 0.02 | 370 |
| Celite ® 560 | white | flux calcined | 25.00 | 22.0 | 0.005 | 1400 |

TABLE 3B

Physical Properties of Various Diatomaceous Earths

| Diatomaceous Earth - Grade | Loose Wt., PCF | Wet Density, PCF | 150 mesh % Retained | 325 Mesh % Retained | % Moisture |
|---|---|---|---|---|---|
| Celite ® 507 | 9.0 | 24.0 | N/A | 0.5 | 0.5 |
| Celite ® 505 | 9.0 | 24.0 | N/A | 0.5 | 0.5 |
| Celite ® 500 | 8.0 | 17.0 | 1.0 | N/A | 3.0 |
| Filter-Cel ® | 8.5 | 18.5 | 1.0 | N/A | 1.0 |
| Celite ® 577 | 9.0 | 19.5 | 1.5 | N/A | 0.5 |
| Std. Super-Cel ® | 9.0 | 19.5 | 4.0 | N/A | 0.5 |
| Celite ® 512 | 9.0 | 19.5 | 5.0 | N/A | 0.5 |
| Celite ® 513 | 10.0 | 19.5 | 6.0 | N/A | 0.1 |
| Hyflo ® Super-Cel Z | 10.0 | 19.5 | 7.0 | N/A | 0.1 |
| Celite ® 501 | 10.0 | 19.5 | 8.0 | N/A | 6.1 |
| Celite ® 503 | 12.0 | 19.5 | 9.0 | N/A | 0.1 |
| Celite ® 535 | 12.0 | 20.0 | 10.0 | N/A | 0.1 |
| Celite ® 545 | 12.0 | 20.0 | 12.0 | N/A | 0.1 |
| Celite ® 560 | 16.0 | 21.5 | 60.0 | N/A | 0.1 |

TABLE 4A

Residual Cobalt Levels (ppm) with each Weight Percent Adsorbent

| | | Permeability | Percent Adsorbent (%) | | | | | | | |
|---|---|---|---|---|---|---|---|---|---|---|
| | | | 0.25 | | 0.5 | | 0.75 | | 1.0 | |
| Example | Adsorbent | (darcy) | F1 | F2 | F1 | F2 | F1 | F2 | F1 | F2 |
| 1 | Celpure ® S25 | 0.025 | 22 | 20 | 18 | 13 | 12 | 9.9 | 9.4 | 6.5 |
| 2 | Celite ® 507 | 0.020 | | | 20 | 18 | 17 | 15 | 13 | 12 |
| 3 | Celpure ® P65 | 0.065 | | | | | | | 11 | 8.2 |
| 4 | Celite ® 505 | 0.060 | | | | | | | 21 | 19 |
| 5 | Celite ® 577[1] | 0.150 | | | | | | | | |
| 6 | Celite ® Standard Super-Cel | 0.300 | | | | | | | 24 | 23 |
| 7 | Celpure ® 1000 | 1.000 | | | | | | | 24 | 24 |
| 8 | Celite ® Hyflo Z | 1.000 | | | | | | | 24 | 25 |
| 9 | Celite ® 535 | 3.000 | | | | | | | 26 | 26 |
| 10 | Celite ® 545 | 4.800 | | | | | | | 26 | 26 |
| 11 | Sepiolite SA 70253[2] | NA | | | 14 | 10 | 7 | 2 | 4.3 | 1.3 |

[1] Perlite used as inert filter aid.
[2] Particle size - 10 μm

TABLE 4B

Residual Cobalt Levels (ppm) with each Weight Percent Adsorbent

| | | Permeability | Percent Adsorbent (%) | | | | | | | | | | | |
|---|---|---|---|---|---|---|---|---|---|---|---|---|---|---|
| | | | 1 | | 1.25 | | 1.5 | | 1.75 | | 2 | | 5 | |
| Ex. | Adsorbent | (darcy) | F1 | F2 | F1 | F2 | F1 | F2 | F1 | F2 | F1 | F2 | F1 | F2 |
| 1 | Celpure ® S25 | 0.025 | 9.4 | 6.5 | 6.8 | 4.8 | 4.2 | 2.3 | 2.8 | 1.6 | 2.1 | 1.2 | | |
| 2 | Celite ® 507 | 0.020 | 13 | 12 | 9.5 | 7.2 | 7.5 | 5.4 | | | 4.7 | 2.8 | | |
| 3 | Celpure ® P65 | 0.065 | 11 | 8.2 | | | | | | | 2.7 | 16 | 1.1 | 1.6 |
| 4 | Celite ® 505 | 0.060 | 21 | 19 | | | | | | | 14 | 11 | | |
| 5 | Celite ® 577[1] | 0.150 | | | | | | | | | 16 | 14 | | |
| 6 | Celite ® Standard Super-Cel | 0.300 | 24 | 23 | | | 23 | 22 | | | | | | |
| 7 | Celpure ® 1000 | 1.000 | 24 | 24 | | | | | | | | | | |
| 8 | Celite ® Hyflo Z | 1.000 | 24 | 25 | | | | | | | | | | |
| 9 | Celite ® 535 | 3.000 | 26 | 26 | | | | | | | | | | |
| 10 | Celite ® 545 | 4.800 | 26 | 26 | | | | | | | | | | |
| 11 | Sepiolite SA 70253[2] | NA | 4.3 | 1.3 | | | | | | | 0.94 | 0 | | |

[1] Perlite used as inert filter aid.
[2] Particle size - 10 μm

TABLE 4C

Overall Residual Cobalt (ppm) at each Weight Percent Adsorbent

| Ex. | Adsorbent | Permeability (darcy) | Adsorbent Percent (%) | | | | | | | | |
|---|---|---|---|---|---|---|---|---|---|---|---|
| | | | 0.25 | 0.5 | 0.75 | 1 | 1.25 | 1.5 | 1.75 | 2 | 5 |
| 1 | Celpure ® S25 | 0.025 | 20.21 | 13.26 | 10.19 | 6.87 | 502 | 2.59 | 1.78 | 1.26 | |
| 2 | Celite ® 507 | 0.020 | | 18.22 | 15.23 | 12.11 | 7.31 | 5.51 | | 2.91 | |
| 3 | Celpure ® P65 | 0.065 | | | | 8.56 | | | | 1.73 | 1.52 |
| 4 | Celite ® 505 | 0.060 | | | | 19.22 | | | | 11.32 | |
| 5 | Celite ® 577[1] | 0.160 | | | | | | | | 14.38 | |
| 6 | Celite ® Standard Super-Cel | 0.300 | | | | 23.13 | | 22.15 | | | |
| 7 | Celpure ® 1000 | 1.000 | | | | 24.00 | | | | | |
| 8 | Celite ® Hyflo Z | 1.000 | | | | 24.91 | | | | | |
| 9 | Celite ® 535 | 3.000 | | | | 26.00 | | | | | |
| 10 | Celite ® 545 | 4.800 | | | | 26.00 | | | | | |
| 11 | Sepiolite ® SA 70253[2] | NA | | 10.42 | 2.8 | 1.70 | | | | 0.06 | |

[1] Perlite used as inert filter aid.
[2] Particle Size - 10 μm

TABLE 5A

Residual Zinc Levels (ppm) with each Weight Percent Adsorbent

| | | Percent Adsorbent (%) | | | | | | | |
|---|---|---|---|---|---|---|---|---|---|
| | Permeability | 0.25 | | 0.5 | | 0.75 | | 1 | |
| Ex. Adsorbent | (darcy) | F1 | F2 | F1 | F2 | F1 | F2 | F1 | F2 |
| 1 Celpure ® S25 | 0.025 | 50 | 46 | 41 | 29 | 28 | 23 | 22 | 15 |
| 2 Celite ® 507 | 0.020 | | | 45 | 40 | 38 | 33 | 29 | 26 |
| 3 Celpure ® P65 | 0.065 | | | | | | | 25 | 18 |
| 4 Celite ® 505 | 0.060 | | | | | | | 47 | 44 |
| 5 Celite ® 577[(1)] | 0.150 | | | | | | | | |
| 6 Celite ® Standard Super-Cel | 0.300 | | | | | | | 56 | 54 |
| 7 Celpure ® 1000 | 1.000 | | | | | | | 55 | 55 |
| 8 Celite ® Hyflo Z | 1.000 | | | | | | | 56 | 58 |
| 9 Celite ® 535 | 3.000 | | | | | | | 57 | 58 |
| 10 Celite ® 545 | 4.800 | | | | | | | 58 | 58 |
| 11 Sepiolite SA 70253[(2)] | NA | | | 32 | 24 | 16 | 5.9 | 10 | 3 |

[(1)] Perlite used as inert filter aid.
[(2)] Particle size - 10 μm

TABLE 5B

Residual Zinc Levels (ppm) with each Weight Percent Adsorbent

| | | Adsorbent Percent (%) | | | | | | | | | | | |
|---|---|---|---|---|---|---|---|---|---|---|---|---|---|
| | Permeability | 1 | | 1.25 | | 1.5 | | 1.75 | | 2 | | 5 | |
| Ex. Adsorbent | (darcy) | F1 | F2 | F1 | F2 | F1 | F2 | F1 | F2 | F1 | F2 | F1 | F2 |
| 1 Celpure ® S25 | 0.025 | 22 | 15 | 16 | 12 | 9.9 | 5.6 | 6.8 | 4.1 | 53 | 3.2 | | |
| 2 Celite ® 507 | 0.020 | 29 | 26 | 22 | 16 | 17 | 12 | | | 11 | 6.4 | | |
| 3 Celpure ® P65 | 0.065 | 25 | 18 | | | | | | | 6.1 | 3.9 | 3.6 | 2.2 |
| 4 Celite ® 505 | 0.060 | 47 | 44 | | | | | | | 31 | 26 | | |
| 5 Celite ® 577[(1)] | 0.150 | | | | | | | | | 56.1 | 53.3 | | |
| 6 Celite ® Standard Super-Cel | 0.300 | 56 | 54 | | | 52 | 50 | | | | | | |
| 7 Celpure ® 1000 | 1.000 | 55 | 55 | | | | | | | | | | |
| 8 Celite ® Hyflo Z | 1.000 | 56 | 58 | | | | | | | | | | |
| 9 Celite ® 535 | 3.000 | 57 | 58 | | | | | | | | | | |
| 10 Celite ® 545 | 4.800 | 58 | 58 | | | | | | | | | | |
| 11 Sepiolite SA 70253[(2)] | NA | 10 | 3 | | | | | | | 2.8 | 1.2 | | |

[(1)] Perlite used as inert filter aid.
[(2)] Particle Size - 10 μm

TABLE 5C

Overall Residual Zinc (ppm) at each Weight Percent Adsorbent

| | Permeability | Adsorbent Percent (%) | | | | | | | | |
|---|---|---|---|---|---|---|---|---|---|---|
| Ex. Adsorbent | (darcy) | 0.25 | 0.5 | 0.75 | 1 | 1.25 | 1.5 | 1.75 | 2 | 5 |
| 1 Celpure ® S25 | 0.025 | 46.4 | 29.6 | 23.7 | 15.9 | 12.4 | 6.25 | 4.5 | 3.35 | |
| 2 Celite ® 507 | 0.020 | | 40.6 | 33.6 | 26.3 | 16.3 | 12.3 | | 6.66 | |
| 3 Celpure ® P65 | 0.065 | | | | 18.9 | | | | 4,16 | 2,42 |
| 4 Celite ® 505 | 0.060 | | | | 44.3 | | | | 26.54 | |
| 5 Celite ® 577[(1)] | 0.160 | | | | | | | | 53.83 | |
| 6 Celite ® Standard Super-Cel | 0.300 | | | | 54.3 | | 50.3 | | | |
| 7 Celpure ® 1000 | 1.000 | | | | 55 | | | | | |
| 8 Celite ® Hyflo Z | 1.000 | | | | 57.8 | | | | | |
| 9 Celite ® 535 | 3.000 | | | | 57.9 | | | | | |
| 10 Celite ® 545 | 4.800 | | | | 58 | | | | | |
| 11 Sepiolite SA 70253[(2)] | NA | | 24.8 | 6.71 | 3.92 | | | | 1.30 | |

[(1)] Perlite used as inert filter aid.
[(2)] Particle Size - 10 μm

TABLE 6

Flow Rates (kg/m² · h) per area for Each Weight Percent Adsorbent

| Ex. | Adsorbent | Permeability (darcy) | 0.25 | 0.5 | 0.75 | 1 | 1.25 | 1.5 | 1.75 | 2 | 5 |
|---|---|---|---|---|---|---|---|---|---|---|---|
| 1 | Celpure ® S25 | 0.025 | 179.96 | 69.22 | 171.04 | 136.36 | 168.12 | 119.51 | 132.45 | 96.38 | |
| 2 | Celite ® 507 | 0.020 | | 441.95 | 252.46 | 291.50 | 207.98 | 130.16 | | 118.88 | |
| 3 | Celpure ® P65 | 0.065 | | | | 114.95 | | | | 157.83 | 73.68 |
| 4 | Celite ® 505 | 0.060 | | | | 441.95 | | | | 326.49 | |
| 5 | Celite ® 577[1] | 0.150 | | | | | | | | 374.37 | |
| 6 | Celite ® Standard Super-Cel | 0.300 | | | | 1006.30 | | 547.87 | | | |
| 7 | Celpure ® 1000 | 1.000 | | | | 801.85 | | | | | |
| 8 | Celite ® Hyflo Z | 1.000 | | | | 723.76 | | | | | |
| 9 | Celite ® 535 | 3.000 | | | | 971.37 | | | | | |
| 10 | Celite ® 545 | 4.800 | | | | 1133.31 | | | | | |
| 11 | Sepiolite SA 70253 | 10 μm** | | 251.77 | | 3.33 | | | | 2.13 | |
| 12 | Celite ® 507 | 50% < 8 μm** | | 441.95 | 252.46 | 291.50 | 207.98 | 130.16 | | 118.88 | |

**Particle size (μm)
[1]Perlite used as inert filter aid.

TABLE 7

Comparison of Polyether Carbonate Polyol with Conventional Polyols Using Celite ® 507 Adsorbent

| Polyol | OH # | Functionality | Viscosity (cSt) | Starting Cobalt Amount (ppm) | Residual Cobalt Analysis (ppm) Adsorbent Percent (%) | | | | | | | |
|---|---|---|---|---|---|---|---|---|---|---|---|---|
| | | | | | 0.5 | | 1 | | 1.5 | | 2 | |
| | | | | | F1 | F2 | F1 | F2 | F1 | F2 | F1 | F2 |
| D | 237 | 3 | 257 | 6.0 | 5.2 | 4.7 | 4.5 | 4.2 | 4.0 | 3.2 | 3.1 | 2.7 |
| C | 57.4 | 3 | 534 | 9.5 | 6.8 | 6.5 | 6.2 | 5.3 | 5.6 | 5.1 | 5.5 | 5.4 |
| B | 20 | 3 | 2455 | 16.5 | 14.9 | 14.5 | 14.2 | 14.6 | 12.1 | 10.7 | 13.6 | 11.0 |
| A | 56 | 3 | 2910 | 28.0 | 20 | 18.0 | 13.0 | 12.0 | 7.5 | 5.4 | 4.7 | 2.8 |

TABLE 8

Comparison of Polyether Carbonate Polyol with Conventional Polyols Using Celite ® 507 Adsorbent

| Polyol | OH # | Functionality | Viscosity (cSt) | Starting Zinc Amount (ppm) | Residual Zinc Analysis (ppm) Adsorbent Percent (%) | | | | | | | |
|---|---|---|---|---|---|---|---|---|---|---|---|---|
| | | | | | 0.5 | | 1 | | 1.5 | | 2 | |
| | | | | | F1 | F2 | F1 | F2 | F1 | F2 | F1 | F2 |
| D | 237 | 3 | 257 | 13.2 | 11.7 | 10.7 | 10.1 | 9.1 | 9.2 | 7.1 | 6.7 | 6.3 |
| C | 57.4 | 3 | 534 | 22.7 | 14.7 | 13.7 | 13.9 | 11.3 | 12.6 | 10.6 | 11.2 | 10.3 |
| B | 20 | 3 | 2455 | 35.7 | 32.2 | 30.8 | 32.0 | 33.2 | 26.5 | 23.3 | 31.6 | 25.5 |
| A | 56 | 3 | 2910 | 63.0 | 45 | 40 | 29 | 26 | 17 | 12 | 11 | 6.4 |

TABLE 9

Flow Rate (kg/m² · h) Comparison of Polyether Carbonate Polyol with Conventional Polyols Using Celite ® 507 Adsorbent - Filter Diameter 12.1 cm

| Polyol | OH # | Functionality | Viscosity (cSt) | Starting Cobalt Amount (ppm) | Flow Rate per area for each Weight Percent Adsorbent Adsorbent Percent (%) | | | |
|---|---|---|---|---|---|---|---|---|
| | | | | | 0.5 | 1 | 1.5 | 2 |
| D | 237 | 3 | 257 | 6.0 | 1439.77 | 1136.11 | 896.80 | 829.94 |
| C | 57.4 | 3 | 534 | 9.5 | 737.45 | 831.20 | 403.08 | 516.22 |
| B | 20 | 3 | 2455 | 16.5 | 229.14 | 192.15 | 149.75 | 167.99 |
| A | 56 | 3 | 2910 | 28.0 | 441.95 | 291.50 | 130.16 | 118.88 |

TABLE 10

Polyol D with and without Propylene Carbonate - Measured at 100° C. for 1 hour

| Example | Polyol | Propylene Carbonate | Adsorbent | Colbalt (ppm) | Zinc (ppm) |
|---------|--------|---------------------|-----------|---------------|------------|
| 13 | A | 10% Added | 2% Celpure ® S 25[1] | 2.1 | 5.3 |
| 14 | A | 10% Added | 2% Celpure ® S 25[1] | 1.2 | 3.2 |
| 15 | A | 0% | 2% Celpure ® S 25[1] | 3.3 | 8.1 |
| 16 | A | 0% | 2% Celpure ® S 25[1] | 1.6 | 4.5 |

[1]With 1% Filter-Aid

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a high purity polyether carbonate polyol which contains no more than 90 ppm of catalyst residue, consisting of
   (1) adding from 0.5% to 5% by weight, based on 100% by weight of polyether carbonate polyol, of diatomaceous earth having a permeability rating of less than or equal to 0.200 darcys to a polyether carbonate polyol to form a suspension;
   (2) mixing the suspension, formed in (1) for a time period of from 30 minutes to 5 hours at temperature in the range of from 20° C. to 150° C.;
   and
   (3) filtering the suspension from (2), thereby forming the high purity polyether carbonate polyol.

2. The process of claim 1, which comprises (1) adding from 0.75% to 2.0% by weight, based on 100% by weight of polyether carbonate polyol, of diatomaceous earth to the polyether carbonate polyol.

3. The process of claim 1, which comprises (1) adding from 1.00 to 1.75% by weight, based on 100% by weight of polyether carbonate polyol, of diatomaceous earth to the polyether carbonate polyol.

4. The process of claim 1, wherein said diatomaceous earth has a permeability rating of from 0.01 to 0.200 darcys.

5. The process of claim 1, wherein said diatomaceous earth has a permeability rating of from 0.02 to 0.150 darcys.

6. The process of claim 1, which comprises (2) mixing said suspension formed in (1) for a time period of from 60 minutes to 240 minutes.

7. The process of claim 1, which comprises (2) mixing said suspension formed in (1) for a time period of from 60 to 90 minutes.

8. The process of claim 1, which comprises (2) mixing said suspension formed in (1) at a temperature in the range of from 70 to 125° C.

9. The process of claim 1, which comprises (2) mixing said suspension formed in (1) at a temperature in the range of from 75 to 120° C.

10. The process of claim wherein said diatomaceous earth is selected from the group consisting of non-calcined diatomaceous earth, calcined diatomaceous earth, flux calcined diatomaceous earth and acid washed diatomaceous earth.

11. The process of claim 1, wherein said polyether carbonate polyol is prepared with a double metal cyanide catalyst.

12. The process of claim 1, wherein said high purity polyether carbonate polyol contains no more than 9 ppm of cobalt residue.

* * * * *